(12) United States Patent
Yoshihara

(10) Patent No.: US 9,489,159 B2
(45) Date of Patent: Nov. 8, 2016

(54) INFORMATION PROCESSING APPARATUS, INFORMATION PROCESSING METHOD, AND STORAGE MEDIUM FOR PERFORMING PROCESSING ON A FUNCTION BASED ON A FREE SPACE

(71) Applicant: CANON KABUSHIKI KAISHA, Tokyo (JP)

(72) Inventor: Toshio Yoshihara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/745,978

(22) Filed: Jun. 22, 2015

(65) Prior Publication Data

US 2015/0370514 A1 Dec. 24, 2015

(30) Foreign Application Priority Data

Jun. 24, 2014 (JP) ................................. 2014-129540

(51) Int. Cl.
*G06F 3/12* (2006.01)
*H04N 1/00* (2006.01)
*H04N 1/21* (2006.01)

(52) U.S. Cl.
CPC ............ *G06F 3/1229* (2013.01); *G06F 3/122* (2013.01); *G06F 3/1204* (2013.01); *G06F 3/1215* (2013.01); *G06F 3/1239* (2013.01); *G06F 3/1275* (2013.01); *G06F 3/1289* (2013.01); *H04N 1/00933* (2013.01); *H04N 1/00938* (2013.01); *H04N 1/00954* (2013.01); *H04N 1/21* (2013.01); *H04N 2201/0094* (2013.01)

(58) Field of Classification Search
CPC ...................................................... G06F 3/1229
USPC ................................ 358/1.13, 1.15; 713/100
See application file for complete search history.

(56) References Cited

U.S. PATENT DOCUMENTS

| | | | | |
|---|---|---|---|---|
| 5,819,026 A | * | 10/1998 | Lhotak | G06F 9/3836 712/245 |
| 6,323,958 B1 | * | 11/2001 | Shimizu | G06K 15/00 358/1.9 |
| 6,587,735 B1 | * | 7/2003 | Yaguchi | H04N 1/00954 358/1.9 |
| 2006/0028661 A1 | * | 2/2006 | Uruma | H04N 1/00408 358/1.6 |
| 2012/0268796 A1 | * | 10/2012 | Takahashi | H04N 1/4051 358/3.13 |

FOREIGN PATENT DOCUMENTS

JP        2000-89963 A        3/2000

* cited by examiner

*Primary Examiner* — Jacky X Zheng
(74) *Attorney, Agent, or Firm* — Canon USA, Inc. IP Division

(57) ABSTRACT

A method executed by an apparatus includes receiving selection of a function, and determining whether to perform hardware processing or software processing on the function based on a free space in a storage unit configured to store hardware information relating to the hardware processing on the function and function information relating to the function.

12 Claims, 15 Drawing Sheets

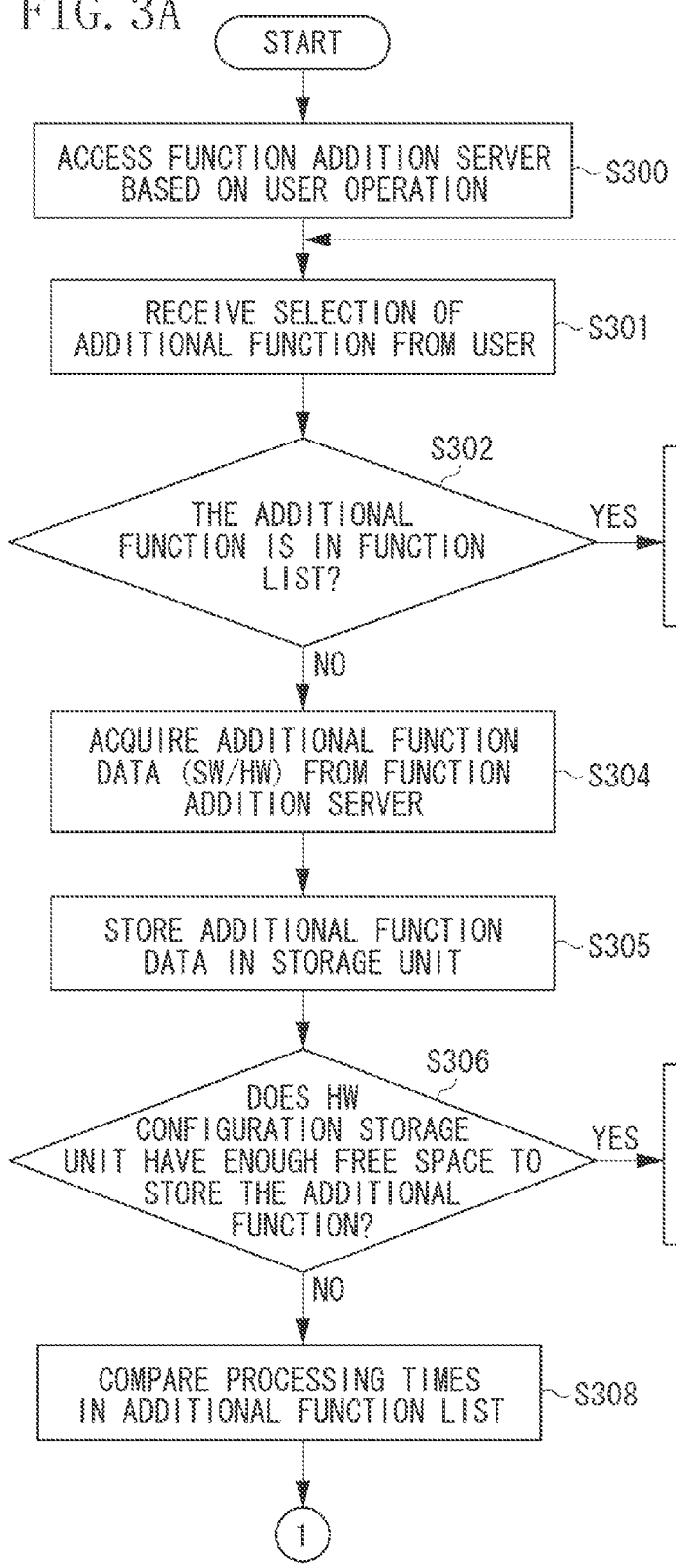
FIG. 3A

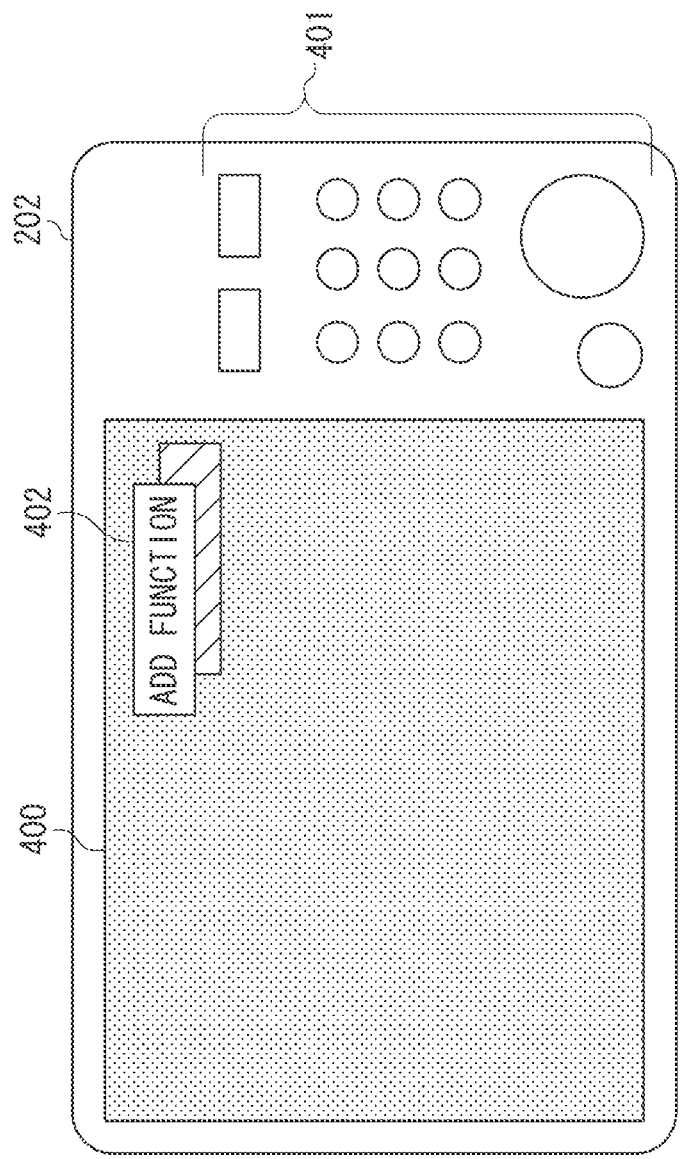

FIG. 5

ADDITIONAL FUNCTION LIST

| FUNCTION NAME | PRIORITY | ALLOCATED PROCESSING | ROM CAPACITY (MB) | HW PERFORMANCE (MB/s) | SW PERFORMANCE (MB/s) | USE FREQUENCY (USED TIMES) | ADDITION DATE AND TIME | ROM ADDRESS |
|---|---|---|---|---|---|---|---|---|
| RESOLUTION CONVERSION | 3 | SW | 3 | 100 | 10 | 10 | 2013/04/01 | – |
| EDGE ENHANCEMENT | 2 | HW | 6 | 50 | 5 | 5 | 2013/04/01 | 0x080_0000 |
| HIGH COMPRESSION PROCESSING | 1 | HW | 8 | 10 | 1 | 2 | 2013/05/01 | 0x000_0000 |
| ... | ... | ... | ... | ... | ... | ... | ... | ... |

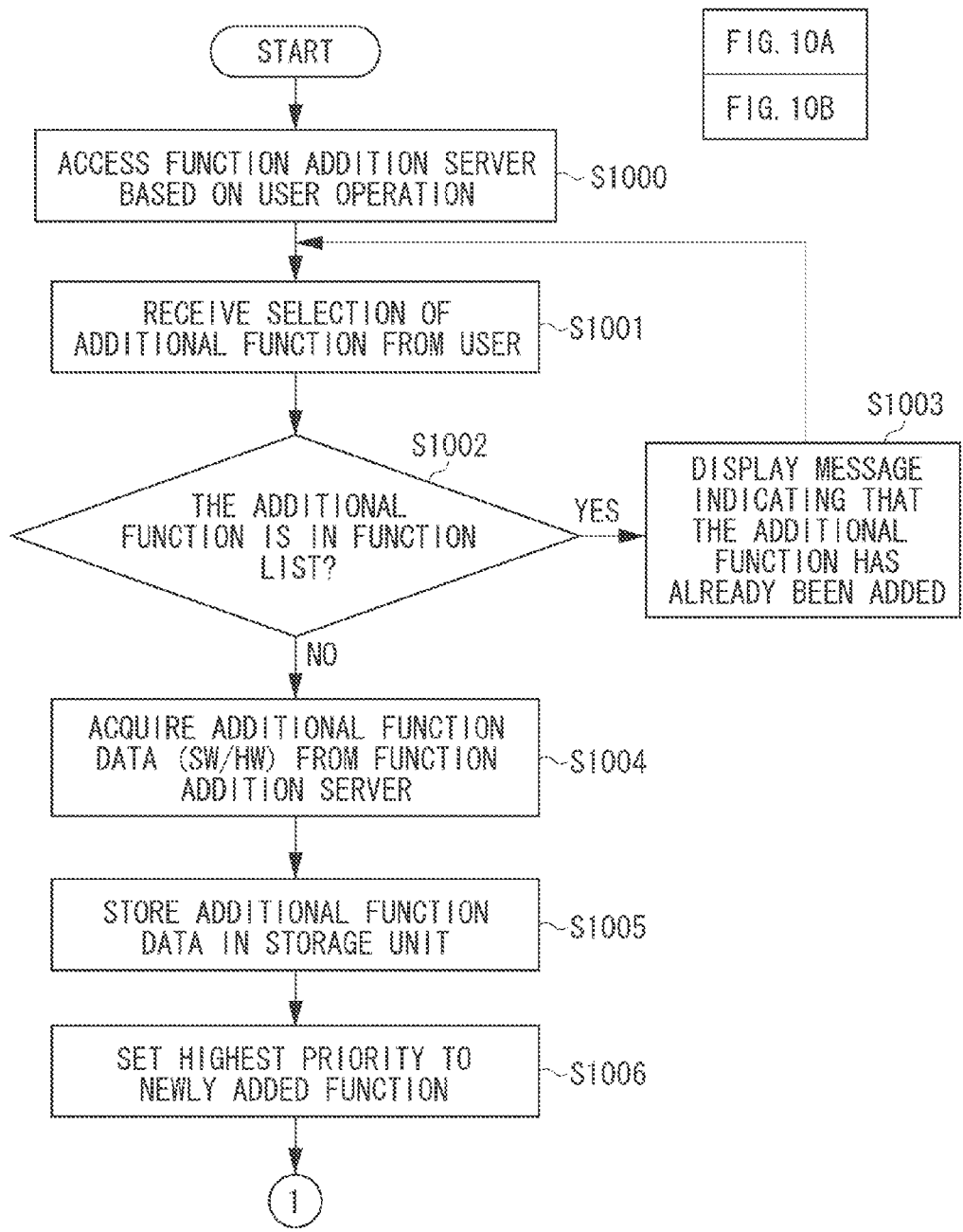

INFORMATION PROCESSING APPARATUS, INFORMATION PROCESSING METHOD, AND STORAGE MEDIUM FOR PERFORMING PROCESSING ON A FUNCTION BASED ON A FREE SPACE

BACKGROUND OF THE INVENTION

1. Field of the Invention

The present invention relates to an information processing apparatus, an information processing method, and a storage medium.

2. Description of the Related Art

In recent years, a user of a device such as a smartphone and a tablet type personal computer has been able to freely download applications as the user desires. Thus, each user can customize the device by a method of performing software (SW) processing on the downloaded application with an arithmetic processing device such as a central processing unit (CPU). A configuration, in which customizing can be achieved by hardware (HW) processing in addition to the customizing by the SW processing, is expected to be an effective solution. More specifically, in the configuration, as the effective solution, the HW processing is freely executed on an additional function required by the user, with a device such as a field-programmable gate array (FPGA), which is one of techniques for dynamically changing hardware functions. This is because the processing speed of specific HW processing is much faster than that of the CPU processing, despite the increased speed of the CPU processing due to the advancement of semiconductors. The high speed HW processing may be essential for an apparatus such as a multi-function peripheral (MFP) that is required to execute real time processing on an input image.

A method of dynamically changing the hardware functions in a single piece of hardware configured of, for example, an FPGA, will be described below. In one method, all the hardware configuration data to be processed is stored in a storage device, such as a random access memory (RAM) connected to the FPGA, and is applied to the FPGA to be processed as appropriate. A technique of reducing time for rewriting the configuration data when the function is switched has been discussed, for example, in Japanese Patent Application Laid-Open No. 2000-89963. More specifically, all the pieces of configuration data are stored in the RAM, which can be accessed at a high speed, and only the configuration data required for the data processing is rewritten.

However, an amount of data storable on the RAM is limited. Thus, in the technique discussed in Japanese Patent Application Laid-Open No. 2000-89963, not all the pieces of configuration data can be loaded on the RAM when there are too many functions to be processed by the HW processing. As a result, when the configuration data that is not loaded on the RAM is used, the configuration data is read out from an external storage apparatus whose access speed is low, and to be applied to the FPGA. As a result, even though the HW processing is executed, a long processing time is required to obtain a result. The user may not have an advantage of the high processing speed by the HW processing in a case where a plurality of additional functions are to be added as customization. As the HW processing becomes more popular for customization in various fields such as smartphones, for executing the functions freely added by the user, the processing of a certain function, among the additional functions, however, may become much slower.

In a situation when too many functions are added, the HW processing or the SW processing may be selectively allocated to each function to be added. However, the functions are added not simultaneously but sequentially. Thus, the optimum sharing configuration of the HW processing and the SW processing may change each time a function is added. More specifically, in a case where a function, which takes a long processing time and thus is supposed to be processed by the HW processing, may be processed by the SW processing, when other additional functions have already occupied the capacity of a random access memory onto which the configuration data is to be loaded, a long processing time may be required.

SUMMARY OF THE INVENTION

According to an aspect of the present invention, an apparatus includes a reception unit configured to receive selection of a function, and a determination unit configured to determine whether to perform hardware processing or software processing on the function based on a free space in a storage unit configured to store hardware information related to the hardware processing on the function and function information related to the function.

Further features of the present invention will become apparent from the following description of exemplary embodiments with reference to the attached drawings.

BRIEF DESCRIPTION OF THE DRAWINGS

FIGS. 4A, 4B, and 4C are diagrams each illustrating an example of a screen displayed on an operation/display unit.

FIG. 5 is a diagram illustrating an example of an additional function list.

DESCRIPTION OF THE EMBODIMENTS

Figure 1:
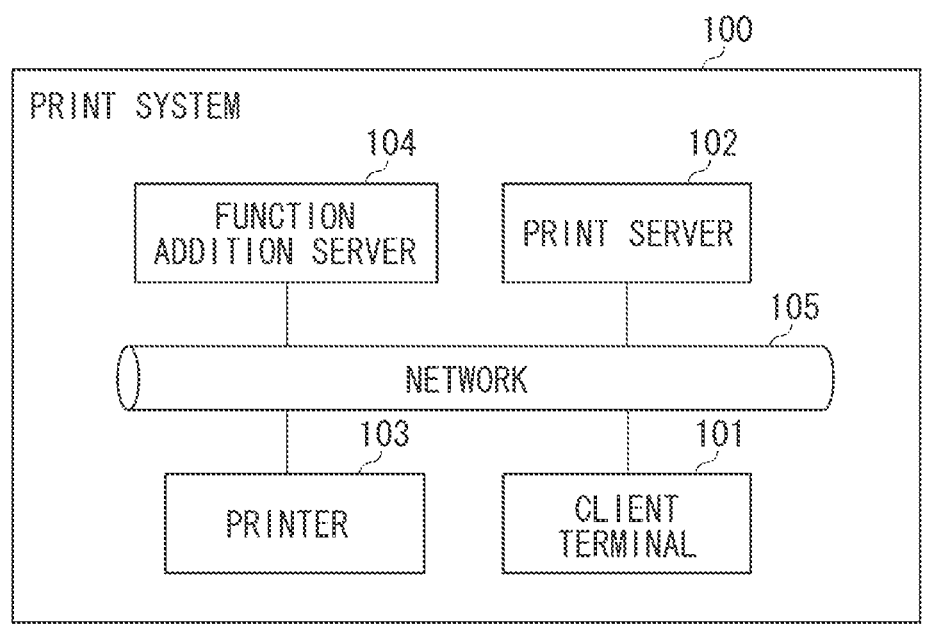
FIG. 1 is a diagram illustrating an example of a system configuration of a print system.

Exemplary embodiments of the present invention are described below with reference to the drawings.
<Overall System Configuration>
Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

FIG. 1 is a block diagram illustrating an example of a system configuration of a print system 100 including apparatuses connected to each other via a network 105. The connection of the apparatuses to the network 105 is established with a wired local area network (LAN), a wireless LAN, or the like.

A client terminal 101 is an electronic device such as a desktop personal computer (PC) or a laptop PC. The client terminal 101 outputs print data via the network 105, whereby a function such as page description language (PDL) print is executed.

A print server 102 receives and stores the print data transmitted from the client terminal 101, and transmits the print data to a printer 103.

The printer 103, which can be connected to the network 105, receives the print data transmitted from the print server 102 and performs printing on paper media or the like.

A function addition server 104 stores data and the like relating to functions added to the printer 103. The printer 103 accesses the function addition server 104 via the network 105, whereby a function selected by the user is downloaded. For example, the function provided by the function addition server 104 corresponds to GooglePlay or the like storing application programs of Android-OS.

Each apparatus illustrated in FIG. 1 includes, as a hardware configuration, at least a control unit (for example, CPU) and a storage unit (for example, a read only memory (ROM)). The control unit executes processing based on a program stored in the storage unit, whereby functions of each apparatus, processing in a flowchart, and the like are implemented.

<Configuration of Printer>

Figure 2:
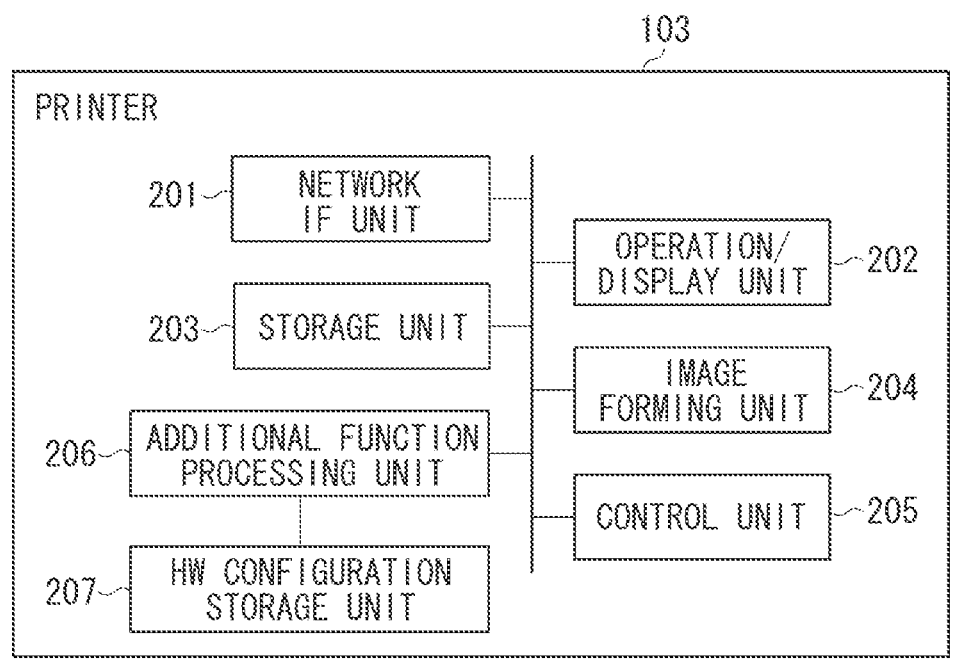
FIG. 2 is a diagram illustrating an example of a hardware configuration of a printer.

FIG. 2 is a diagram illustrating an example of a hardware configuration of the printer 103.

A network interface (IF) unit 201, which is compliant with the wired LAN such as Gigabit Ethernet (registered trademark), receives and transmits data to and from external apparatuses via the wired LAN. The network IF unit 201 may be configured as the wireless LAN interface.

An operation/display unit 202 is a device, such as a touch panel, having both display and operation functions, and functions as a user interface of the printer 103. The operation/display unit 202 may be configured as a combination of a liquid crystal display and hard keys.

A storage unit 203, which is a storage device such as a hard disk or a solid state drive (SSD), stores print data and the like. The storage unit 203 also functions as an auxiliary storage device for the control unit 205, and stores HW configuration data and a SW processing program for additional functions. The SW processing program is a program for realizing an additional function that can be processed by the control unit 205, and is compiled object data.

An image forming unit 204 includes devices that form an image, based on the print data, on a paper medium. For example, the image forming unit 204 in a laser printer system includes a sheet conveyance device, photosensitive drums, a fixing device, and the like.

The control unit 205 is a central processing device for controlling the printer 103.

An additional function processing unit 206 is a device that executes HW processing on additional functions, and includes an FPGA and the like. Examples of the additional functions include resolution conversion processing, compression/decompression processing, and the like.

A HW configuration storage unit 207 stores configuration data for the HW processing executed by the additional function processing unit 206. The HW configuration storage unit 207 is a device that is connected to the additional function processing unit 206. Thus, the additional function processing unit 206 can read out data in the HW configuration storage unit 207. The HW configuration storage unit 207 is a flash ROM or a dynamic random access memory (DRAM), for example. In the present exemplary embodiment, the HW configuration storage unit 207 is a flash ROM. A configuration using a DRAM only differs from the configuration of the present exemplary embodiment in an access method.

<Information Processing of Changing Functional Configuration Based on Processing Time Required for Executing Additional Function>

Figure 3B:
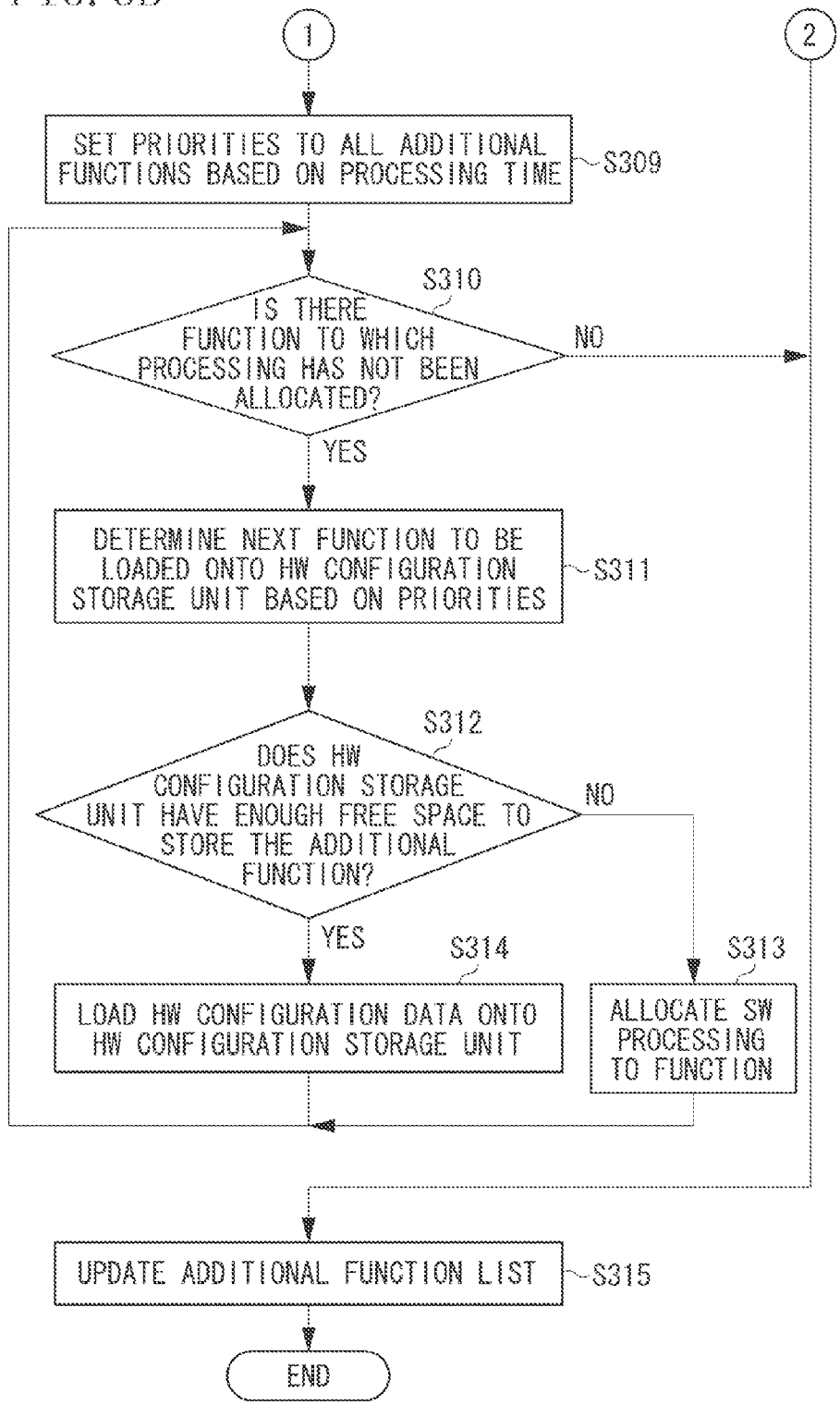
FIG. 3 (3A and 3B) is a flowchart illustrating an example of information processing of changing a functional configuration based on processing time required for executing an additional function.

FIG. 3 (3A and 3B) is a flowchart illustrating an example of information processing of changing a functional configuration based on processing time required for executing an additional function.

In step S300, the control unit 205 accesses the function addition server 104 based on a user operation on the operation/display unit 202 of the printer 103. The control unit 205 accesses the network 105 via the network IF unit 201 and further accesses the function addition server 104. Herein, a general Transmission Control Protocol/Internet Protocol (TCP/IP) protocol is supposed to be employed as the access method of the control unit 205. However, other access methods may be employed. FIG. 4A illustrates an example of a display screen of the operation/display unit 202. As illustrated in FIG. 4A, the operation/display unit 202 includes a touch panel 400 and push buttons 401. The touch panel 400 displays an image and also serves as an input device to perform input by the user touching the screen. The push buttons 401 are used for inputting numerical values with ten keys and instructing an operation such as start of copy processing. An add function button 402, used for accessing the function addition server 104, is disposed next to the buttons for issuing the instruction. The user presses the add function button 402 to instruct the printer 103 to access the function addition server 104. In the present exemplary embodiment, the function is added via the network. Alternatively, for example, an additional function that has been stored in a storage medium such as a universal serial bus (USB) memory can be installed in the printer 103.

Figure 4B:
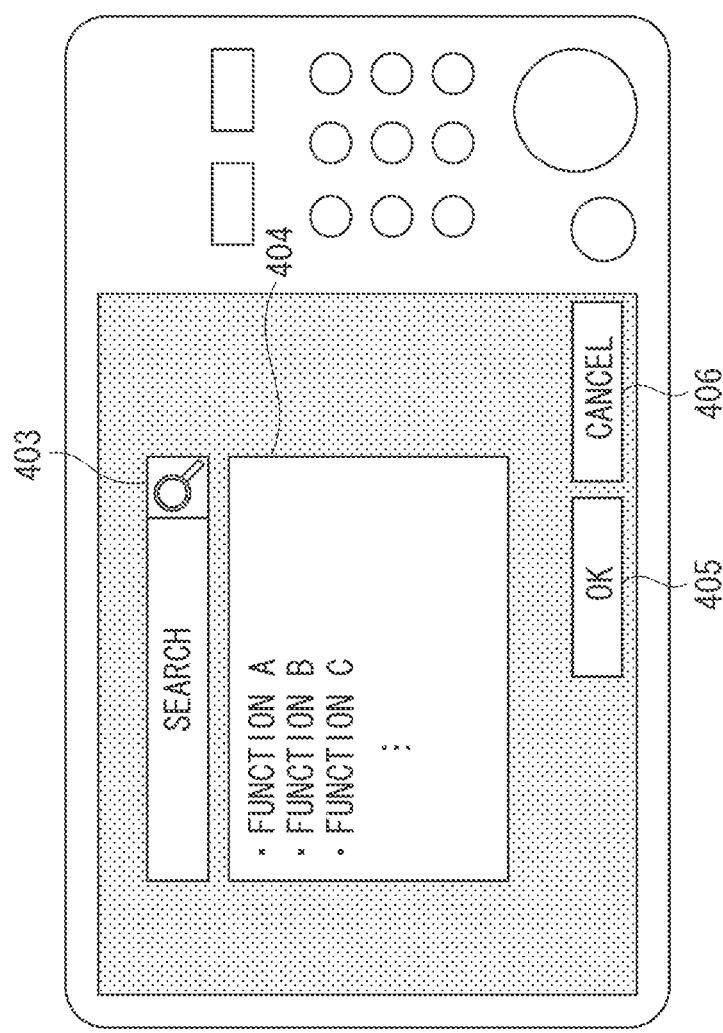

In step S301, the control unit 205 receives selection of a function to be added (additional function) based on a selection operation by the user via the display screen. The processing performed in step S301 is an example of reception processing. FIG. 4B illustrates an example of a display screen on the operation/display unit 202 at the time of the processing in step S301. As illustrated in FIG. 4B, the display screen includes an input portion 403 and a display portion 404. A search condition for searching for a function and the like are input to the input portion 403. The display portion 404 displays a search result. The user determines the additional function by selecting one of the functions displayed on the display portion 404 and pressing an OK button 405. When the user presses a cancel button 406, the control unit 205 returns the screen to that illustrated in FIG. 4A, and the processing illustrated in FIG. 3 is terminated. In this way, the user can search for and select the desired function.

In step S302, the control unit 205 determines whether the additional function received in step S301 has already been added to the printer 103. More specifically, the control unit 205 determines whether the additional function received in step S301 has already been added to the printer 103 based on whether the additional function is in an additional function list held by the storage unit 203. When the received additional function is already in the additional function list (YES in step S302), the processing proceeds to step S303. On the other hand, when the received additional function is not in the additional function list (NO in step S302), the processing proceeds to step S304. The additional function list is an example of a list of additional functions.

FIG. 5 illustrates an example of the additional function list. The additional function list is a list for managing the additional functions that have been already added to the printer 103. The control unit 205 collates the function name of the additional function that has been selected by the user and received, with the function names in the additional function list, and thus determines whether the function has already been added. The additional function list includes information such as allocated processing indicating whether the additional function is currently a target of the HW processing or the SW processing, a size of the HW configuration data, a use frequency of the added function, and an addition date and time indicating when the function has been added. The additional function list further includes HW performance and SW performance required for processing the corresponding function. The performances indicate the data amount that can be processed per unit time, and are values measured under the same condition. The function allocated to the HW processing includes a ROM address as a start address of the HW configuration data stored in the HW configuration storage unit 207.

Figure 6A:
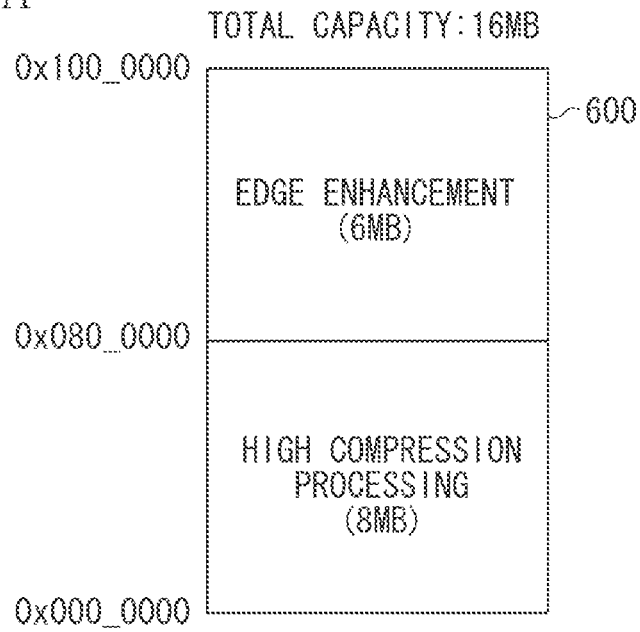
FIGS. 6A and 6B are diagrams illustrating examples of an address map and additional function data

FIG. 6A illustrates an example of an address map 600 of the HW configuration storage unit 207 based on priorities in the additional function list in FIG. 5. The HW configuration data relating to high compression processing with the highest priority starts to be stored from an address 0x000_0000. Then, the HW configuration data relating to an edge enhancement with the second highest priority starts to be stored from an address 0x080_0000. The address information is used when data processing is actually executed. The control unit 205 reads out the HW configuration data from the HW configuration storage unit 207 based on the address information in the additional function list before the data processing is executed, and loads the HW configuration data onto the additional function processing unit 206. Such a rewriting of the HW configuration data, which can be implemented by the FPGA technique, is not directly related to the processing in the present exemplary embodiment and thus will not be described in detail.

Figure 6B:
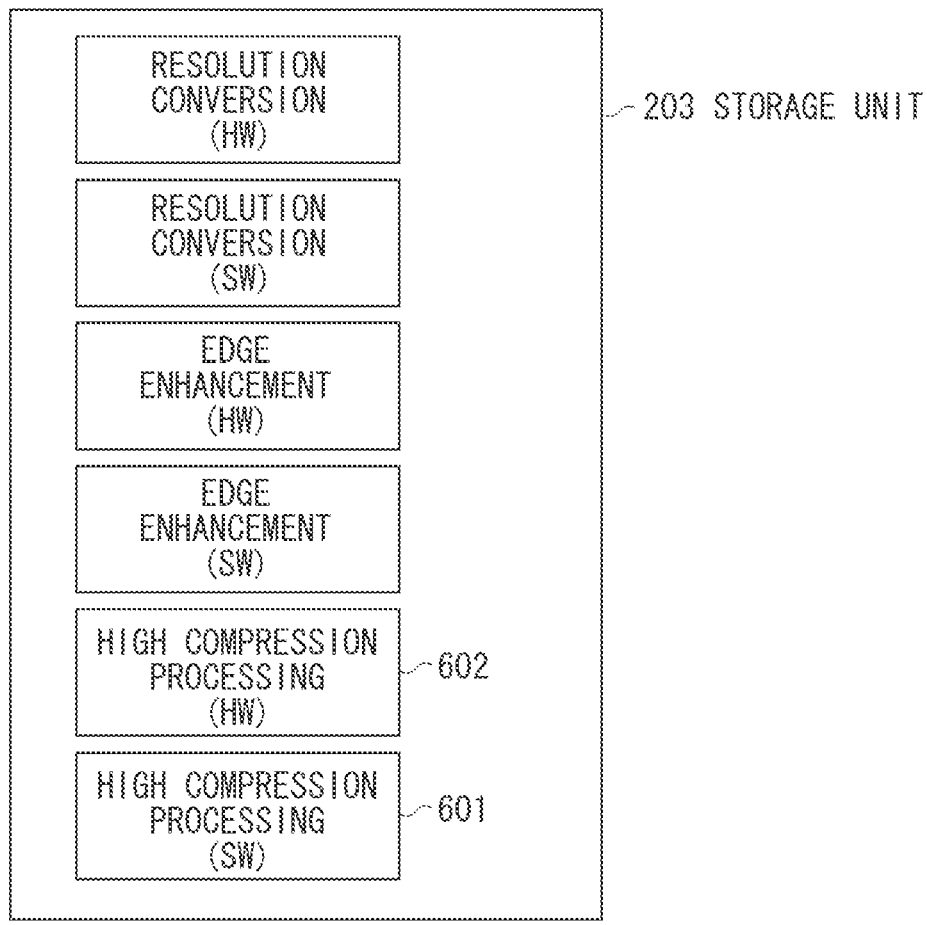

FIG. 6B illustrates the SW processing program and HW configuration data stored in the storage unit 203 as a processing execution program for executing a function. As illustrated in FIG. 6B, the SW processing program and the HW configuration data are both stored for each additional function. For example, a SW processing program 601 and HW configuration data 602 are stored for the high compression processing. To execute the SW processing, the control unit 205 reads out and executes the SW processing program stored in the storage unit 203.

Figure 4C:
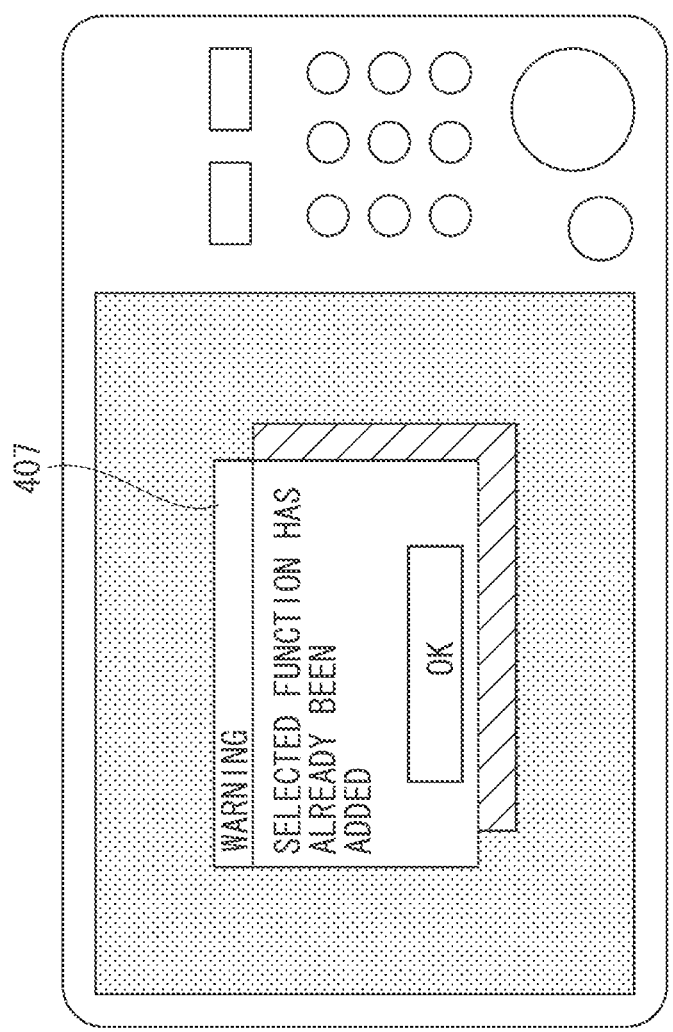

In step S303, the control unit 205 displays a message indicating that the additional function selected by the user has already been added, on the display screen of the operation/display unit 202 as illustrated in FIG. 4C as an example. As illustrated in FIG. 4C, a popup display screen 407 is displayed on the touch panel 400. When OK on the popup display screen 407 is pressed, the processing returns to step S301, and thus the control unit 205 displays the function selection screen.

In step S304, the control unit 205 requests the function addition server 104 to transmit the additional function data as the processing execution data for executing the additional function selected by the user, and thus receives the additional function data. The additional function data transmitted from the function addition server 104 is the processing execution program for executing the function, and includes both the SW processing program and the HW configuration data. Thus, the control unit 205 can select between the SW processing executed by the control unit 205 and the HW processing executed by the additional function processing unit 206, for executing the additional function. The transmitted additional function data includes not only the HW configuration data but also the size of the HW configuration data and the execution processing time of the HW processing that are registered in the additional function list by the control unit 205. The processing in step S304 is an example of acquisition processing for acquiring the additional function data.

In step S305, the control unit 205 stores the additional function data in the storage unit 203. The additional function data of all the additional functions is stored in the storage unit 203.

In step S306, the control unit 205 determines whether the HW configuration data of the additional function data can be loaded onto the HW configuration storage unit 207. More specifically, the control unit 205 determines whether the free space of the HW configuration storage unit 207 is equal to or larger than the HW configuration data size of the additional function data. When the control unit 205 determines that the free space of the HW configuration storage unit 207 is equal to or larger than the HW configuration data size of the additional function data (YES in step S306), the processing proceeds to step S307. On the other hand, when the control unit 205 determines that the free space of the HW configuration storage unit 207 is smaller than the HW configuration data size of the additional function data (NO in step S306), the processing proceeds to step S308. The HW configuration data is an example of hardware information.

In step S307, the control unit 205 loads the HW configuration data onto the HW configuration storage unit 207 to execute the HW processing for the additional function. Then, the processing proceeds to step S315.

In step S308, the control unit 205 compares the processing time required for executing the newly added additional function with the processing time required for executing each of the additional functions that have been added to the additional function list.

In step S309, the control unit 205 determines the priorities based on the processing time required for executing each of the additional functions. In the additional function list illustrated in FIG. 5 as an example, the high compression processing (10 MB/s) has the highest priority, the edge enhancement (50 MB/s) has the second highest priority, and the resolution conversion (100 MB/s) has the lowest priority. The priorities are determined in such a manner that, of the functions with the same HW performance, a higher priority is allocated to the one with the lower SW performance. Thus, when the HW processing is performed like this, it is more time efficient. As described above, the control unit 205 determines the priorities based on the HW performance and the SW performance.

In step S310, the control unit 205 determines whether there is an additional function to which the HW processing or the SW processing has not been allocated, in the additional function list. When the HW processing or the SW processing is allocated to all the additional functions (No in step S310), the processing proceeds to step S315. On the other hand, when there is any additional function to which no processing is allocated (YES in step S310), the processing proceeds to step S311.

In step S311, the control unit 205 determines the additional function with the highest priority in the additional functions to which no processing is allocated. Then, the processing proceeds to step S312.

In step S312, the control unit 205 compares the ROM capacity required for the additional function determined in step S311 with the current ROM free space. When the HW configuration data size of the additional function data is equal to or smaller than the free space in the HW configuration storage unit 207 (YES in step S312), the processing proceeds to step S314. On the other hand, when the HW configuration data size of the additional function data is larger than the free space in the HW configuration storage unit 207 (NO in step S312), the processing proceeds to step S313.

In step S313, the control unit 205 allocates the SW processing to the corresponding additional function. Then, the processing returns to step S310.

In step S314, the control unit 205 loads the HW configuration data onto the HW configuration storage unit 207 to execute the HW processing on the additional function.

In step S315, the control unit 205 updates the additional function list. More specifically, the control unit 205 updates the priority, the allocated processing, the ROM address, and the addition date and time.

In the flowchart described above, the processing, in which the control unit 205 accesses the function addition server 104, receives the selection of the additional function, and allocates the HW processing or the SW processing to all the additional functions based on the processing time required for executing each of the additional functions, is described. With the processing, the SW processing or the HW processing can be selected as the method for executing the additional function. Furthermore, the priorities can be changed based on the processing time required for executing each of the additional functions so that the HW processing is more preferentially allocated. Thus, the HW processing, achieving faster execution processing, can be allocated to the processing requiring a long processing time.

<Information Processing of Changing Priorities Based on User Selection>

Figure 7:
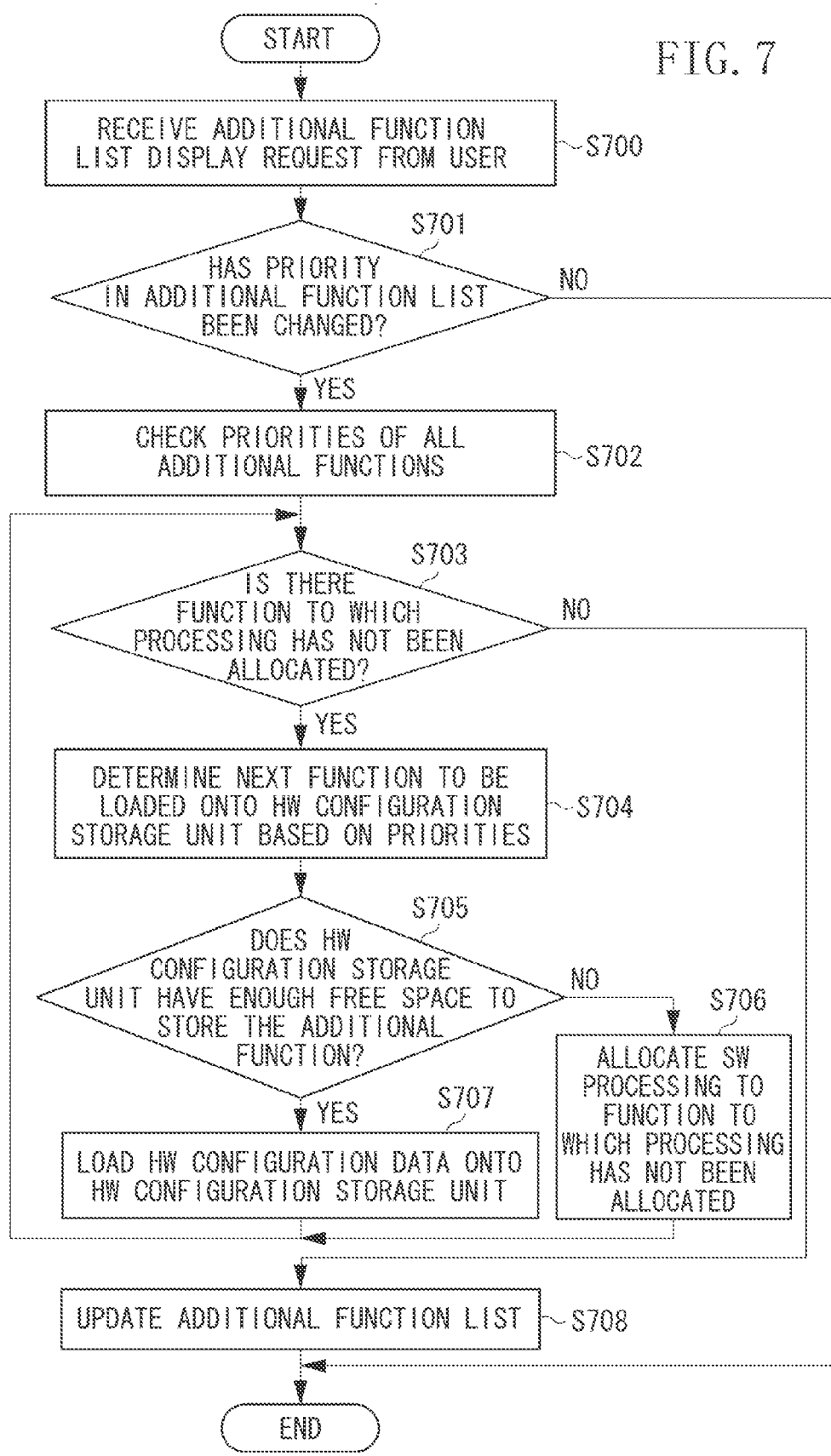
FIG. 7 is a flowchart illustrating an example of information processing of changing priorities based on user selection.

FIG. 7 is a flowchart illustrating an example of information processing of changing the priorities based on the user selection.

In step S700, the control unit 205 receives a request to display the additional function list from the user, via the screen of the operation/display unit 202 and the like, for example.

Figure 8:
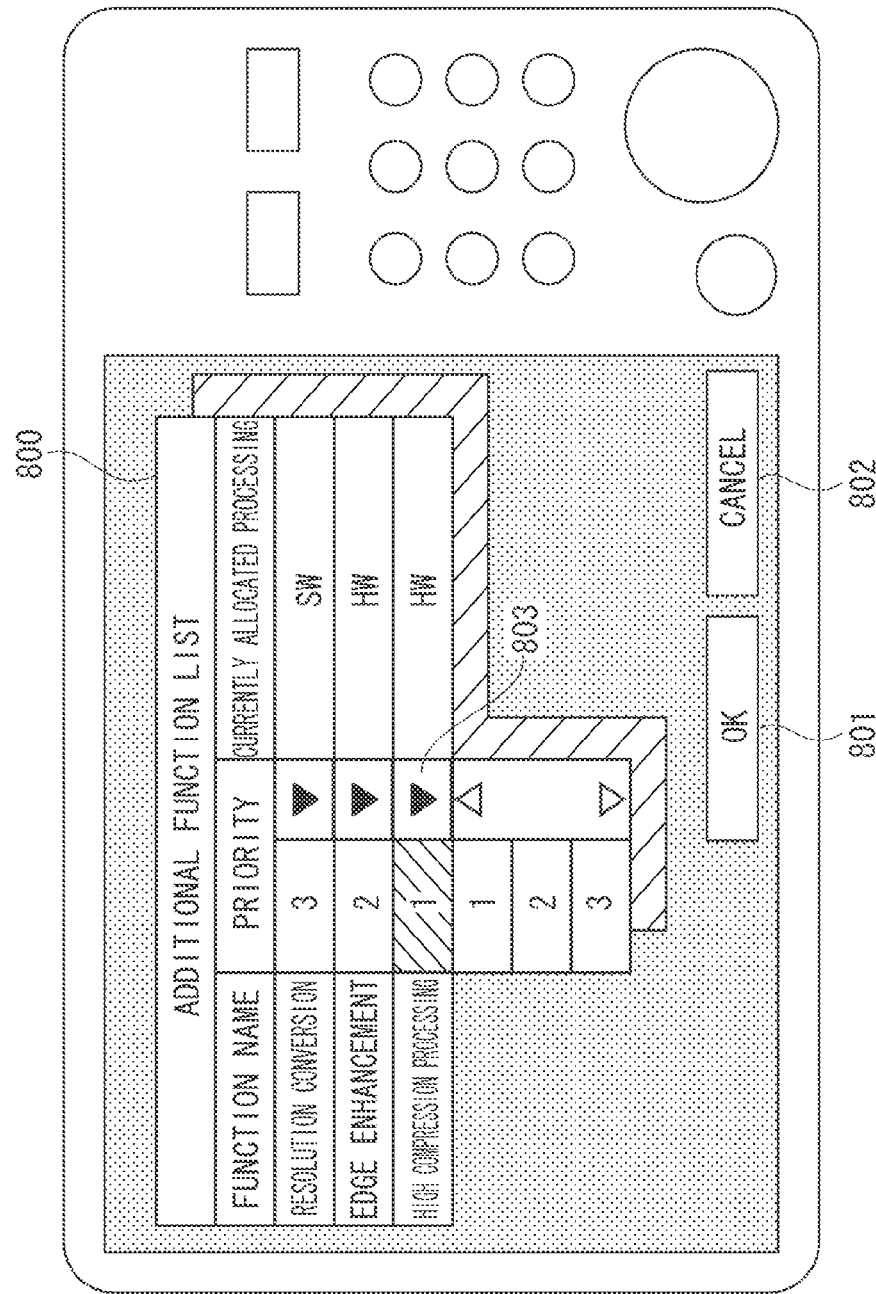
FIG. 8 is a diagram illustrating an example of a screen for changing priorities in the additional function list.

In step S701, the control unit 205 determines whether the user has changed the priorities in the additional function list. FIG. 8 illustrates an example of the display screen of the operation/display unit 202. As illustrated in FIG. 8, the names, the priorities, and the currently allocated processing to the additional function are displayed on an additional function list 800. The user issues an instruction to change the priority by selecting a pulldown button 803 of a priority item of the additional function list 800. When an OK button 801 is pressed with no change in the priority or a cancel button 802 is pressed (NO in step S701), the processing illustrated in FIG. 7 is terminated. On the other hand, when the OK button 801 is pressed with the priorities in the additional function list 800 changed (YES in step S701), the processing proceeds to step S702.

In step S702, the control unit 205 checks the priorities of all the additional functions that have been changed. Then, the processing proceeds to step S703.

The processing in step S703 to step S708 is similar to the processing in step S310 to step S315 in FIG. 3, and thus will not be described.

In the flowchart described above, the method, in which the user issues an instruction to change the additional function list 800 to reallocate the allocated processing, is described. With this processing, the user can set the priorities of the additional functions, whereby whether the HW processing and the SW processing is to be allocated to a function can be determined by the user's intention.

<Information Processing of Changing Priorities Based on Use Frequencies>

Figure 9:
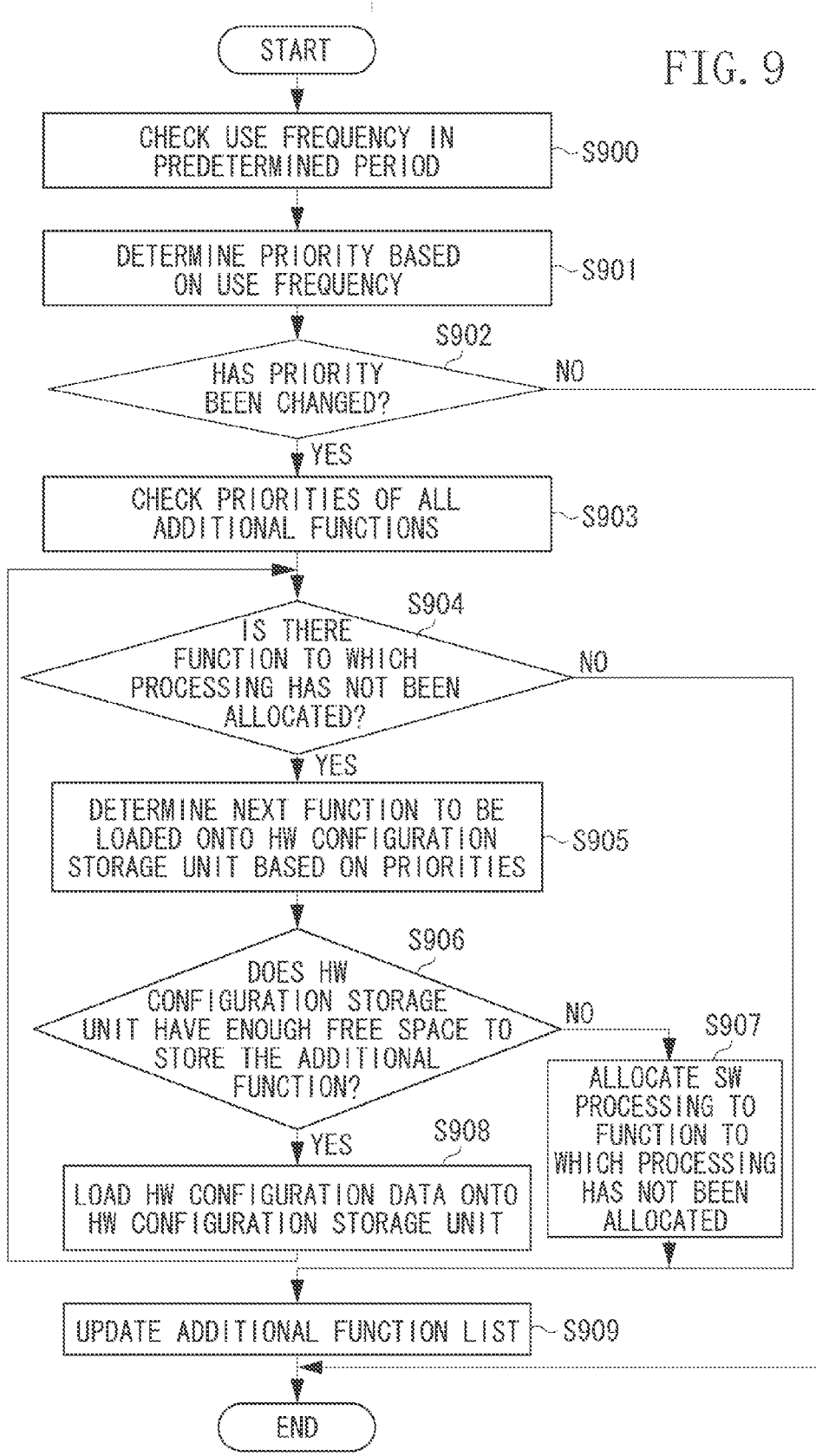
FIG. 9 is a flowchart illustrating an example of information processing of changing the priorities based on a use frequency of the additional function.

FIG. 9 is a flowchart illustrating an example of information processing of changing the priorities based on the use frequency of each of the additional functions.

In step S900, the control unit 205 checks the use frequencies in a predetermined period of the additional functions in the additional function list. For example, the control unit 205 checks the use frequency of each of the additional functions in each month or in each week. In the present exemplary embodiment, the timing at which the use frequencies are checked is based on the period described above. Alternatively, the use frequencies may be checked when any of the additional functions is used, for example.

In step S901, the control unit 205 determines the priorities based on the use frequency of each of the additional functions in the additional function list. For example, the control unit 205 determines the priorities in such a manner that the highest priority is set to the additional function with the highest use frequency.

In step S902, the control unit 205 determines whether the priorities in the additional function list have been changed in the processing in step S901. When the priorities in the additional function list have been changed (YES in step S902), the processing proceeds to step S903. On the other hand, when the priorities in the additional function list have not been changed (NO in step S902), the processing illustrated in FIG. 9 is terminated.

In step S903, the control unit 205 checks the priorities of all the additional functions that have been changed. Then, the processing proceeds to step S904.

Processing in step S904 to step S909 is similar to the processing in step S310 to step S315 in FIG. 3, and thus will not be described.

In the flowchart described above, the method, in which the allocated processing is reallocated based on the use frequency of each of the additional functions, is described. With this processing, the HW processing, achieving faster processing speed, is allocated to the function that is most frequently used under the use state of the user. Thus, the processing can be optimally allocated unintentionally.

<Information Processing of Changing Functional Configuration Based on Addition Date and Time of Additional Function>

Figure 10B:
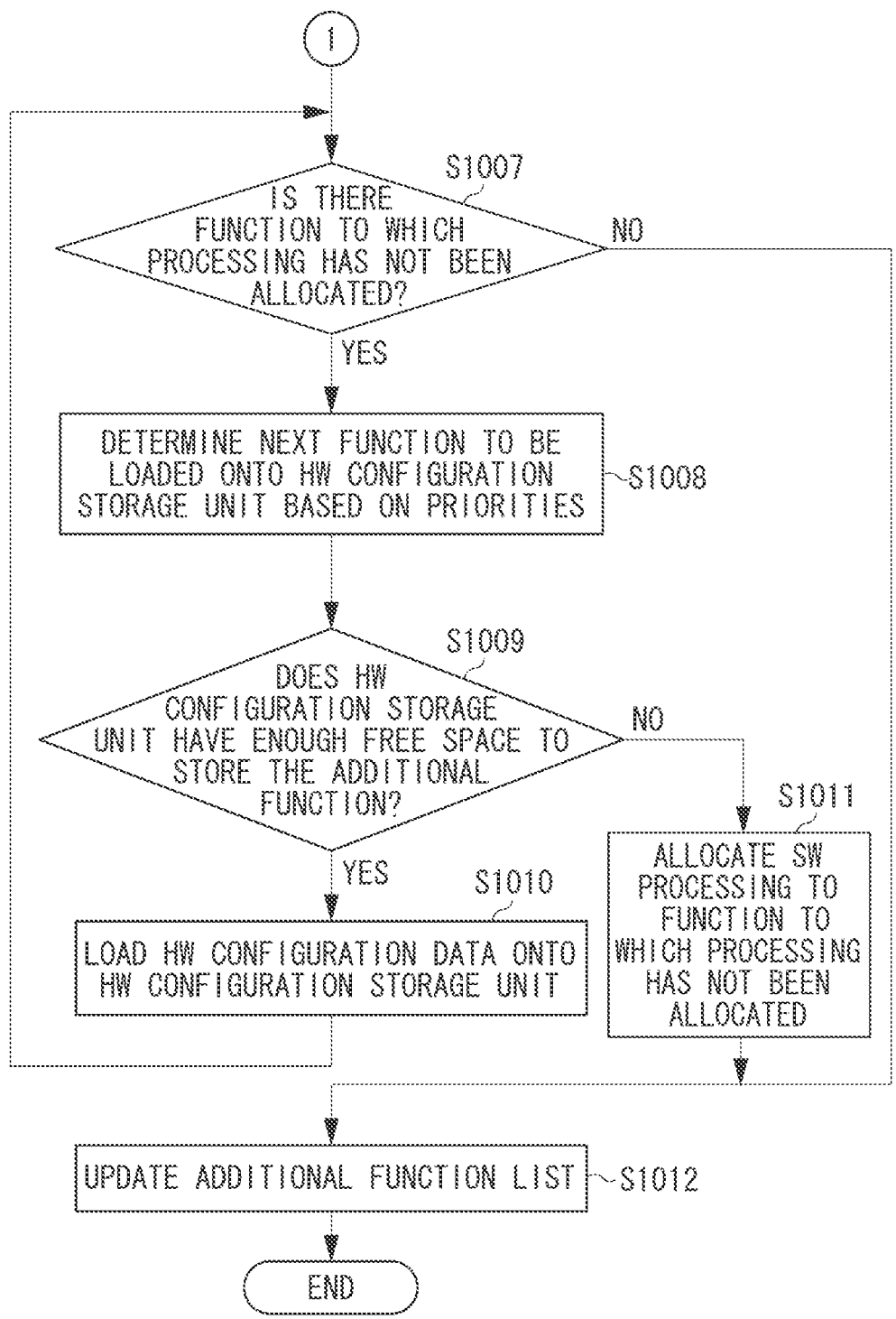
FIG. 10 (10A and 10B) is a flowchart illustrating an example of information processing of changing the functional configuration based on a addition date and time of each of the additional functions.

FIG. 10 (FIG. 10A and FIG. 10B) is a flowchart illustrating an example of information processing of changing the functional configuration based on the addition date and time of each of the additional functions.

Processing in steps S1000 to S1005 is similar to the processing in steps S300 to S305 in FIG. 3, and thus will not be described.

In step S1006, the control unit 205 sets the highest priority to the newly added function in the additional function list (sets the priority to the 1st, for example).

Processing in steps S1007 to S1012 is similar to the processing in steps S310 to S315 in FIG. 3, and thus will not be described.

In the flowchart described above, the method, in which the allocated processing is reallocated based on the addition date and time of each of the additional functions, is described. Thus, the HW processing, achieving the higher processing speed, is more likely to be allocated to the additional function with a newer addition date and time. Thus, the processing can be optimally allocated unintentionally.

The control unit 205 may switch among the three methods of determining the functional configuration based on the processing time required for executing each of the additional functions as in FIG. 3, based on the use frequency of each of the additional functions as in FIG. 9, and based on the addition date and time of each of the additional functions as in FIG. 10, in accordance with an operation on the operation/display unit 202 by the user. With such a configuration, the functional configuration can be determined based on the operation on the operation/display unit 202 by the user. The processing time, the use frequency, and the addition date and time are each an example of the additional function information.

<Processing of Executing Additional Function>

Figure 11:
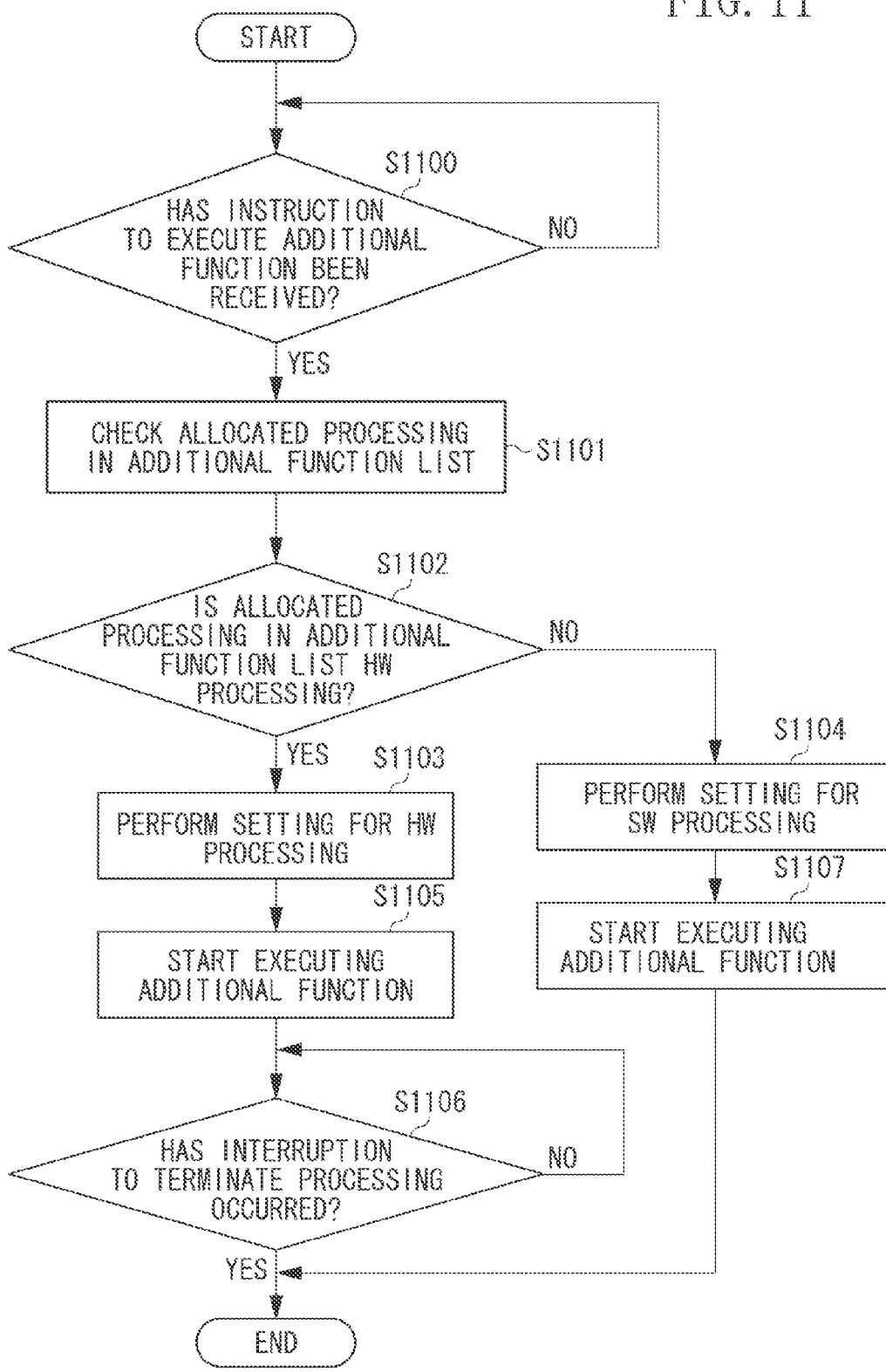
FIG. 11 is a flowchart illustrating an example of processing of executing an additional function.

FIG. 11 is a flowchart illustrating an example of processing for executing an additional function. In FIG. 11, the processing of executing a function in accordance with the HW processing or the SW processing as the allocated processing set according to the additional function list is described.

In step S1100, the control unit 205 determines whether an instruction to execute any of the additional functions has been received. When the instruction to execute any of the additional functions has been received (YES in step S1100), the processing proceeds to step S1101.

In step S1101, the control unit 205 checks the allocated processing to the additional function in the additional function list.

In step S1102, the control unit 205 determines whether the allocated processing to the additional function to be executed is the HW processing or the SW processing, based on the result of the checking in step S1101. When the control unit 205 determines that the allocated processing is the HW processing (YES in step S1102), the processing proceeds to step S1103. On the other hand, when the control unit 205 determines that the allocated processing is the SW processing (NO in step S1102), the processing proceeds to step S1104.

In step S1103, the control unit 205 performs setting required for the HW processing. For example, the control unit 205 performs transferring setting for transferring processing target data from the storage unit 203 to the additional function processing unit 206. In other words, the processing target data is transferred to the additional function processing unit 206 when the HW processing is executed. More specifically, the control unit 205 performs address setting for transferring the data from the storage unit 203 to the additional function processing unit 206 and setting of an IF module installed in the storage unit 203 and the additional function processing unit 206. The control unit 205 further performs register setting and the like so that the detail setting of the additional function becomes valid in the HW processing. For example, when the additional function is the resolution conversion, the control unit 205 sets a target resolution and a register for determining various parameters in various conversion tables. These various settings vary among the additional functions and thus will not be described in detail.

In step S1104, the control unit 205 performs setting required for the SW processing, which is the SW setting corresponding to the HW setting set in step S1103.

In step S1105, the control unit 205 starts executing the processing of the additional function. For example, the processing starts when the control unit 205 accesses a register in the additional function processing unit 206.

In step S1106, the control unit 205 waits for an interruption that occurs when all the data processing is ended. When the interruption occurs (YES in step S1106), the processing illustrated in FIG. 11 is terminated.

In step S1107, the control unit 205 executes the SW processing. Thereafter, the processing illustrated in FIG. 11 is terminated.

In the flowchart described above, executing the processing of the additional function is described. With the processing, the function addition can be executed by both the HW processing and the SW processing.

The present exemplary embodiment may be implemented by the following processing. Specifically, a program that implements at least one function in the exemplary embodiments described above may be supplied to a system or an apparatus via a network or a storage medium. Then, at least one processor in a computer of the system or the apparatus may read out and execute the program. The present invention may also be executed with a circuit (for example, an application specific integrated circuit (ASIC)) that implements the at least one function.

In the exemplary embodiments described above, the processing to be performed on a plurality of additional functions is determined to be executed by the SW processing or the HW processing based on the processing time required for executing each additional function and the capacity of the a storage unit onto which the configuration data is loaded. With this configuration, the HW processing can be allocated to the function requiring a long processing time, whereby the optimum allocation can be achieved. Further, the user can determine whether the SW processing or the HW processing is to be executed on a plurality of additional functions, whereby the intension of the user can be reflected. Furthermore, the processing to be executed can be determined to be the SW processing or the HW processing based on the use frequencies of a plurality of functions in the apparatus. Thus, the time efficiency, depending on the use state of the user, can be improved as much as possible.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-129540, filed Jun. 24, 2014, which is hereby incorporated by reference herein in its entirety.

What is claimed is:

1. An apparatus comprising:
    a reception unit configured to receive selection of a function; and
    a determination unit configured to determine whether to perform hardware processing or software processing on the function based on a free space in a storage unit configured to store hardware information related to the hardware processing on the function and a processing time required for executing the function; and
    an adding unit configured to add the function to a function list,
    wherein the determination unit is configured to determine a priority of the function in the function list based on the processing time required for executing the function, and determine whether to perform the hardware processing or the software processing on the function, based on the determined priority of the function and the free space in the storage unit,
    wherein at least one of the reception unit, the determination unit and the adding unit, is implemented by a processor.

2. The apparatus according to claim 1, further comprising an execution unit configured to execute the function by the hardware processing or the software processing that has been determined.

3. The apparatus according to claim 1, further comprising an acquisition unit configured to acquire function data of the function,
    wherein the function data includes the hardware information and a software program relating to the function.

4. The apparatus according to claim 1, further comprising a change unit configured to change the priority of functions in the function list.

5. The apparatus according to claim 4, wherein upon receiving a request to display the function list, the change unit is configured to display a screen in which the function list is displayed on a display unit, and change priorities of functions in the function list in accordance with a selection operation via the screen.

6. The information processing apparatus according to claim 1, further comprising an image forming unit configured to form an image.

7. A method executed by an apparatus, the method comprising:
    receiving selection of a function; and
    determining whether to perform hardware processing or software processing on the function based on a free space in a storage unit configured to store hardware information relating to the hardware processing on the function and a processing time required for executing the function; and
    adding the function to a function list,
    wherein the determining determines a priority of the function in the function list based on the processing time required for executing the function, and determines whether to perform the hardware processing or the software processing on the function, based on the determined priority of the function and the free space in the storage unit, wherein at least one of the receiving, the determining and the adding, is implemented by a processor.

8. The method according to claim 7, further comprising executing the function by the hardware processing or the software processing that has been determined.

9. The method according to claim 7, further comprising acquiring function data of the function, wherein the function data includes the hardware information and a software program relating to the function.

10. A non-transitory computer-readable storage medium storing a program for causing a computer to execute a method, the method comprising:

receiving selection of a function; and determining whether to perform hardware processing or software processing on the function based on a free space in a storage unit configured to store hardware information relating to the hardware processing on the function and a processing time required for executing the function; and adding the function to a function list, wherein the determining determines a priority of the function in the function list based on the processing time required for executing the function, and determines whether to perform the hardware processing or the software processing on the function, based on the determined priority of the function and the free space in the storage unit, wherein at least one of the receiving, the determining and the adding, is implemented by a processor.

11. The non-transitory computer-readable storage medium according to claim 10, further comprising executing the function by the hardware processing or the software processing that has been determined.

12. The non-transitory computer-readable storage medium according to claim 10, further comprising acquiring function data of the function, wherein the function data includes the hardware information and a software program relating to the function.

* * * * *